United States Patent [19]

Szego

[11] 4,168,640
[45] Sep. 25, 1979

[54] EXPANDED FOIL CUTTING METHOD

[75] Inventor: Andrew Szego, Toronto, Canada

[73] Assignee: Explosafe America Inc., Rexdale, Canada

[21] Appl. No.: 879,222

[22] Filed: Feb. 21, 1978

[51] Int. Cl.² .................................... B23D 27/04
[52] U.S. Cl. .................................... 83/56; 83/13; 30/216; 83/916
[58] Field of Search ............... 83/56, 13, 916; 30/216

[56] References Cited

U.S. PATENT DOCUMENTS

| 2,630,628 | 3/1953 | Hall | 30/216 |
| 3,200,493 | 8/1965 | Dodegge | 30/216 |

*Primary Examiner*—Donald R. Schran
*Attorney, Agent, or Firm*—Ridout & Maybee

[57] ABSTRACT

The cutting of masses composed of multiple thickness of expanded foil is accomplished using reciprocating toothed blades that are deeply notched so that the strands of the expanded mesh enter deeply into the notches and are sheared through between the teeth of the blades.

11 Claims, 5 Drawing Figures

U.S. Patent    Sep. 25, 1979    4,168,640
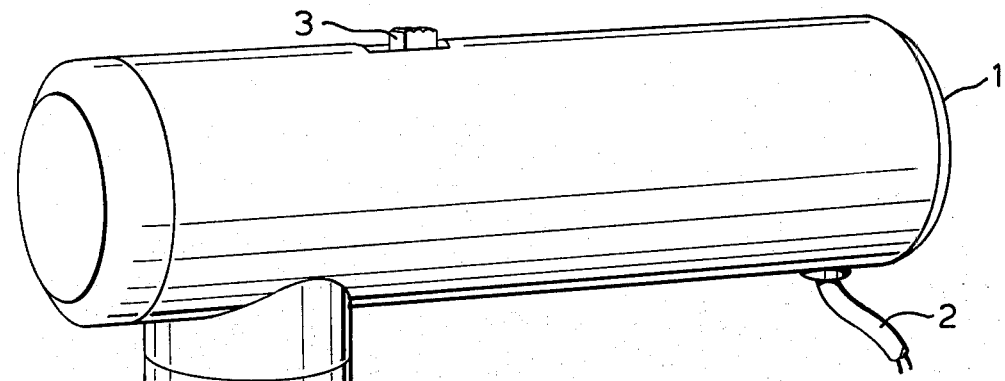
FIG. 1
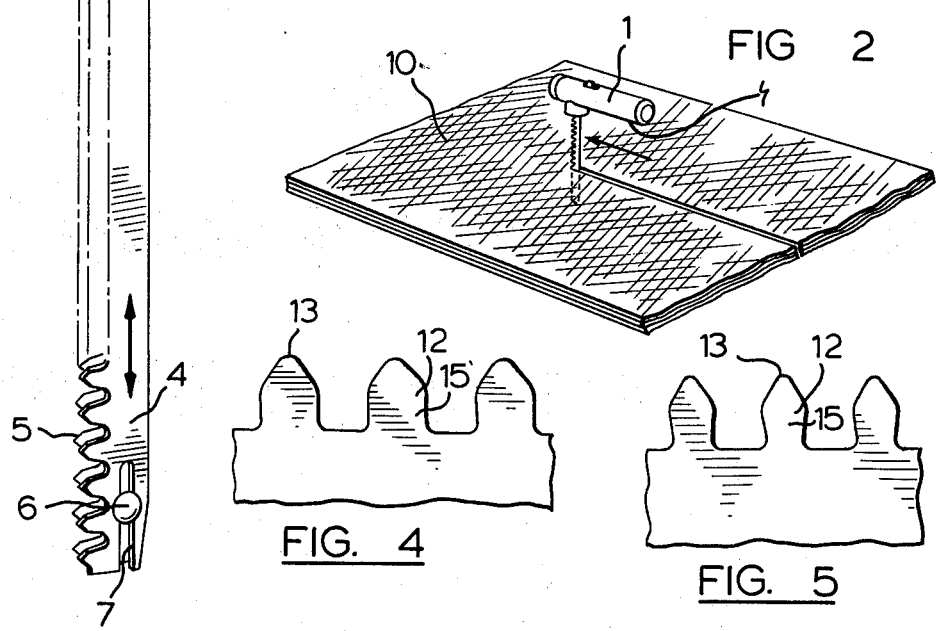
FIG. 2
FIG. 4
FIG. 5
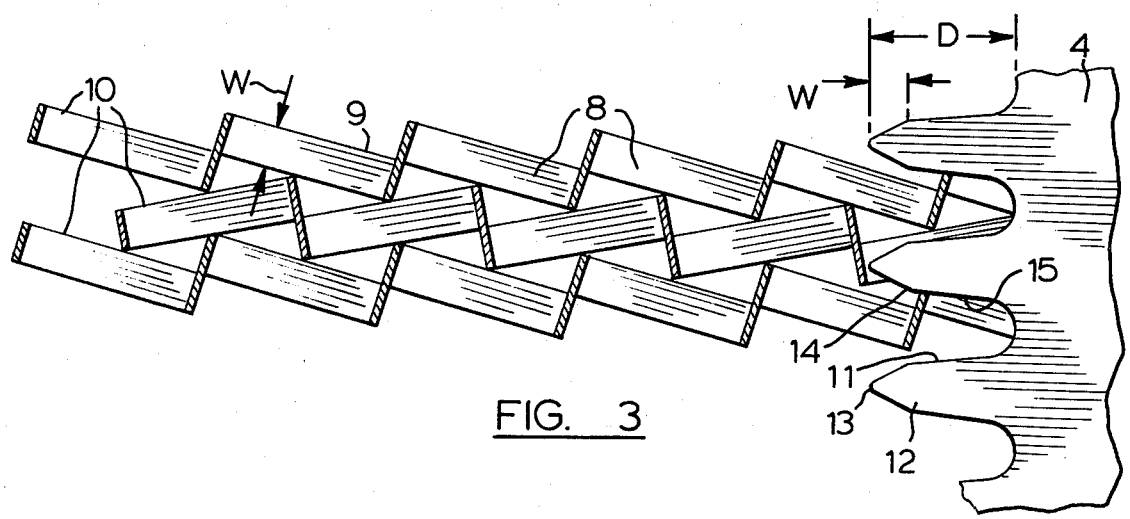
FIG. 3

EXPANDED FOIL CUTTING METHOD

BACKGROUND OF THE INVENTION

The invention relates to a cutting method more particularly for cutting through filler masses formed from layers of expanded foil.

U.S. Pat. No. 3,356,256 to J. Szego and patent application Ser. No. 818,581 filed July 25, 1977, entitled Anti-Explosion Filler Masses, disclose masses composed of multiple layers of expanded aluminum foil which are used as explosion-suppressive inserts in fuel containers. On occasion it may be necessary to cut through these masses and trim them or shape them to appropriate contours and dimensions, so that the mass can be inserted into a fuel container, and can completely fill all the voids in the container.

Conventional shears can be used for cutting individual pieces of the expanded foil, but cannot satisfactorily be applied to cutting multiple-layer masses, and tend to compress the masses and permanently deform them. Conventional double-bladed reciprocating saws, such as are supplied for cutting through expanded plastic foam materials, have been found also to be unsuitable, as they tend to abrade the mesh strands of the metal and produce quantities of metal dust.

SUMMARY OF THE INVENTION

There is now provided a cutting method wherein a double-bladed reciprocating cutter is used having toothed blades in which each notch between the cutter teeth is sufficiently deep that it can entirely receive the full strand width of each strand of the expanded mesh, the mesh strands thus being received within the notches in the cutting operation and being subjected to shearing between the edges of cooperating teeth of the two reciprocating blades.

Desirably, the depth of the notches is at least twice the mesh strand width, and each tooth of the blades, at least in the region extending inwardly from the tip and over a distance equal to the mesh strand width, has a maximum width no greater than about three times, more preferably no greater than about twice, the mesh strand width.

BRIEF DESCRIPTION OF THE DRAWINGS

The accompanying drawings illustrate an example of the invention.

FIG. 1 shows one form of pneumatically-powered cutter device;

FIG. 2 shows the application of the cutter to the operation of cutting or trimming expanded metal foil layers;

FIG. 3 is an enlarged view illustrating the action of the cutter blades; and

FIGS. 4 and 5 are enlarged views of alternative forms of notched cutter blade profiles.

DESCRIPTION OF THE PREFERRED EMBODIMENTS

The cutter device that is illustrated comprises a handle 1 which houses a pneumatic motor powered from an air supply conduit 2 and operating under the control of an on-off control button 3. The motor drives a pair of reciprocating cutter blades 4 and 5. These comprise flat, notched blades that are held together in face-to-face relationship and which at their lower ends are retained together through a sliding connection comprising a rivet 6, or similar projection with an enlarged retaining head, fixed on one blade and sliding in a longitudinal slot 7 in the other blade.

It will be appreciated that any convenient reciprocating drive arrangement may be employed for operating the cutter blades 4 and 5. In this instance, the pneumatic drive that is illustrated is generally similar to that employed in a commercially-available reciprocating saw conventionally employed for sawing through rigid expanded plastics foams, e.g. polystyrene foam.

However, whereas in the known reciprocating plastics-cutting saw the blades are formed with the conventional saw tooth profile, exhibiting a shallow triangular zig-zag contour, it will be noted that the cutter blades 4 and 5 employed in the present invention are formed with a deeply notched profile, more akin to the deeply notched profile of the usual form of garden hedge trimmer blade.

The expanded material that is to be cut or trimmed is similar to the conventional expanded metal material except it is made from a thin gauge foil. The expanded foil may be rotary slit material or reciprocating cut material. Both of these types of metal-expansion are well known to those skilled in the art. As shown in more detail in FIG. 3, the expanded material, whether produced as rotary slit material or reciprocating cut material, is in the form of an open mesh having uniform mesh openings 8 that are of diamond shape viewed in plan. The openings are defined by interconnected inclined mesh strands 9 which are of uniform width W. As disclosed in the above-mentioned patent and patent application, the expanded material may typically be an expanded aluminum foil, but it will be appreciated that the method of the invention is applicable to the cutting and trimming of other expanded foil materials.

As illustrated in FIGS. 2 and 3, in cutting through a plurality of layers 10 of the expanded material, the cutter is passed through the layers with the notched edges of the reciprocating blades foremost.

The notches 11 between the teeth 12 of each of the blades 4 and 5 are formed to a depth D such that the complete width W of the mesh strands 9 can be received in the notches 11. Owing to this configuration of the notched edges of the blades, the cutting action as observed in practice is consistent with successive strands 9 of the mesh being received deeply within the notches 11 when the notches of the blades are in registration and each strand then being cleanly sheared through between the two blades as the blades move reciprocatively out of registration. It is found that the mass of expanded foil is cut through without substantial compression or deformation of the areas of the mass adjacent the cutting line and little or no fine dust is produced. Employing the present method, therefore, a shaped filler mass of desired contour and dimension can be produced without producing quantities of inconvenient fine dust material and without unduly deforming the mass or compacting it to an undesirably high bulk density.

In the preferred form, the depth D of each notch is at least twice the strand width W. In order to reduce the compression and deformation of the expanded foil layers it is desirable that the teeth 12 should be relatively narrow, and preferably the width of each tooth 12 at least in the region extending inward from its pointed tip 13 and for a distance W' equal to the strand width W, does not exceed about three times, preferably no more than about twice, the strand width W. The compression and deformation of the foil can also be reduced by increasing the number of notches 11 per inch, so that each notch receives only one or two layers of the expanded foil and large numbers of layers are not crushed together in each cutting stroke. Advantageously, therefore the number of notches 11 per unit length is such that the number of layers of expanded foil per unit thickness is not more than about twice the number of notches per unit length on the blades.

In order to ensure that the teeth 12 penetrate between the mesh strands 9 and properly shear them through in each reciprocating cutting stroke, it is desirable to provide each tooth 12 with a pointed tip portion which tapers sharply to the tip 13 from an angled shoulder 14 rearwardly from which there is a body portion 15 which tapers less sharply towards the root of the tooth.

Typically, in the expanded foil layers used as explosion suppressive filler masses, the strand width W will be in the range 1/32 to 7/32 of an inch. With material of strand width in this range, a satisfactory cutting action is achieved employing blades having notches 11 of depth D about twice to three times the strand width W and the notches having a width no more than about three times the strand width and being separated by teeth 12 of width no more than about twice the strand width.

One preferred form of notch profile is shown in FIG. 3 where the sides of the body portion 15 taper gently and merge smoothly in a rounded portion at the bottom of the notch 11. Examples of alternative tooth and notch profiles are illustrated in FIGS. 4 and 5. In FIG. 4, each tooth 12 has a body portion 15 which is straight-sided and of constant width. In FIG. 5, the body portion 15 tapers towards the root of the tooth 12.

Although a filler mass is illustrated in the drawings comprising a number of parallel layers of expanded foil, it will be appreciated that coiled bales of the expanded foil can also be cut through in the same manner, as well as other forms of filler mass made up from multiple thicknesses of the expanded foil.

I claim:

1. A method for trimming or shaping a mass composed of a plurality of superimposed thicknesses of expanded foil having uniform diamond-shaped mesh openings bounded by inclined mesh strands of uniform width which comprises applying to the mass a cutter having regularly-notched and toothed reciprocating flat blades placed together face-to-face and means reciprocating the blades longitudinally relative to one another, each notch in the blades being deeper than the width of the strands of the mesh that is to be cut, passing the blades with their notched sides foremost through the mass, receiving successive strands of the mesh deeply into the notches of each blade when said notches are in registration and shearing said strands received in said notches through on reciprocative movement of said blades out of registration.

2. A method as claimed in claim 1 wherein the blades have notches each having a depth at least twice the mesh strand width.

3. A method as claimed in claim 1 wherein the blades have teeth each having a maximum width no greater than about three times the mesh strand width, at least in the region of the tooth extending inward from its tip and over a distance equal to the mesh strand width.

4. A method as claimed in claim 3 wherein the blades have teeth having said maximum width at most about twice the mesh strand width.

5. A method as claimed in claim 1 wherein the number of layers of expanded foil per unit thickness of the mass does not exceed about twice the number of notches per unit length on the blades.

6. A method as claimed in claim 1 in which the expanded foil is expanded aluminum foil.

7. A method as claimed in claim 1 wherein the blades have teeth each comprising a body portion having sides defining the sides of the notch and a tip portion which tapers sharply from the body portion.

8. A method as claimed in claim 7 wherein the lower end of each notch is smoothly rounded and merges smoothly with sides of the body portions of the adjacent teeth, the body portion sides tapering less sharply than the tip portion.

9. A method as claimed in claim 7 in which each tooth has a body portion which tapers towards its root.

10. A method as claimed in claim 7 in which each tooth has a straight-sided constant width body portion.

11. In the trimming or shaping of a mass composed of a plurality of layers of expanded metal foil mesh having inclined mesh strands of a strand width of from 1/32 to 7/32 of an inch, the cutting method comprising applying to the mass a cutter having reciprocating cutter blades formed with regular notches of depth about twice to three times the strand width and width no more than about three times the strand width and being separated by teeth of width no more than about twice the strand width.

* * * * *